United States Patent
Kleinsasser

[11] Patent Number: 5,850,805
[45] Date of Patent: Dec. 22, 1998

[54] CLOG RESISTANT ANIMAL FEEDER

[76] Inventor: Michael Kleinsasser, 17866 Glendale Dr., Frankford, S. Dak. 57440

[21] Appl. No.: 920,664

[22] Filed: Aug. 29, 1997

[51] Int. Cl.$^6$ ..................................................... A01K 5/00
[52] U.S. Cl. ............................................ 119/54; 119/53.5
[58] Field of Search .............................. 119/54, 52.1, 53, 119/53.5, 75

[56] References Cited

U.S. PATENT DOCUMENTS

| | | |
|---|---|---|
| 1,062,610 | 5/1913 | Schisler . |
| 1,720,884 | 7/1929 | Clarke . |
| 3,812,823 | 5/1974 | Ridder et al. ............................. 119/54 |
| 4,040,389 | 8/1977 | Walters ................................. 119/52.1 |
| 4,242,985 | 1/1981 | Freeborn ................................. 119/54 |
| 4,377,130 | 3/1983 | Schwieger ............................. 119/51.5 |
| 4,719,875 | 1/1988 | Van Gilst ............................. 119/54 X |
| 4,825,811 | 5/1989 | O'Kelley ................................. 119/51.5 |
| 4,889,078 | 12/1989 | Smiley ................................. 119/52.1 X |
| 5,036,798 | 8/1991 | King ..................................... 119/54 X |
| 5,123,379 | 6/1992 | Von Taschitzki ..................... 119/53.5 |
| 5,146,872 | 9/1992 | Waldner ................................. 119/54 |
| 5,243,930 | 9/1993 | Rahm ..................................... 119/54 |
| 5,272,998 | 12/1993 | Pannier et al. ......................... 119/53.5 |
| 5,558,039 | 9/1996 | Zimmerman ........................... 119/52.1 |
| 5,595,139 | 1/1997 | Hofer et al. ............................. 119/54 |
| 5,636,592 | 6/1997 | Wechsler ............................. 119/52.1 |

*Primary Examiner*—Michael J. Carone
*Assistant Examiner*—Yvonne Abbott
*Attorney, Agent, or Firm*—Michael S. Neustel

[57] ABSTRACT

A clog resistant animal feeder for providing an animal feeder, especially for pigs, which is clog resistant and which is adjustable for allowing only a specified amount of feed to be dispensed at a time. The inventive device includes a storage bin having slanted side walls, a first tube within a lower portion of the bin, and a support member horizontally positioned within the bin, an elongated frame adjustably attached to the support member projecting downwardly through the side walls about the first tube, and a second tube pivotally attached to the elongated frame about the first tube. A pair of chains are preferably connected to the second tube for allowing an animal to engage the chain with their nose portion for manipulating the second tube where after any clogged feed within the first tube is jarred loose where it is dispensed out from the second tube. The vertical position of the elongated frame determines the amount of feed dispensed because of the distance between the second tube and a floor of the feeder.

6 Claims, 2 Drawing Sheets

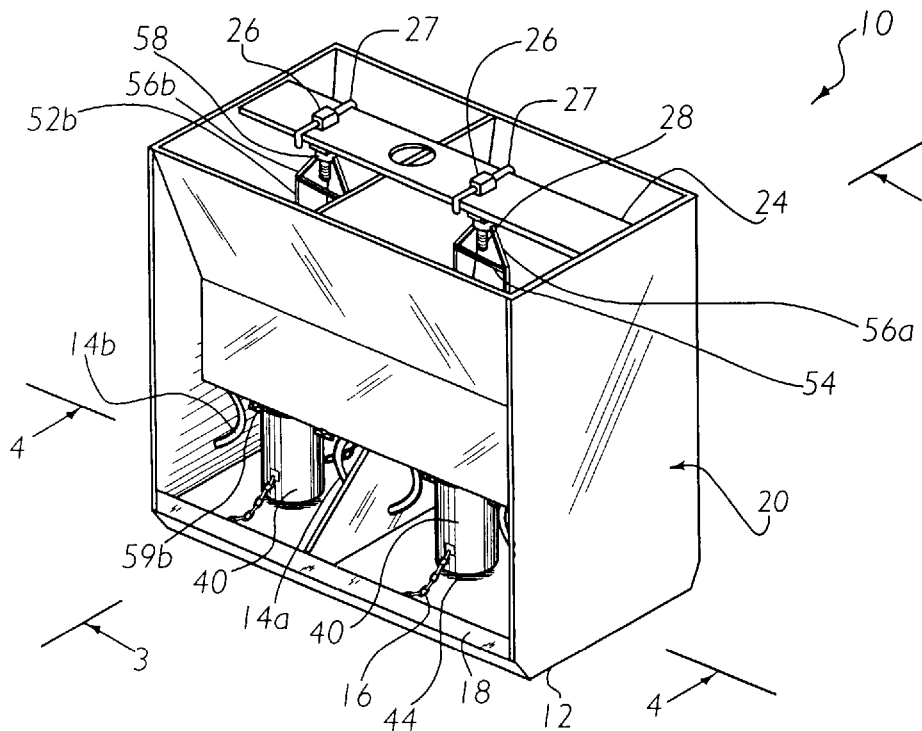
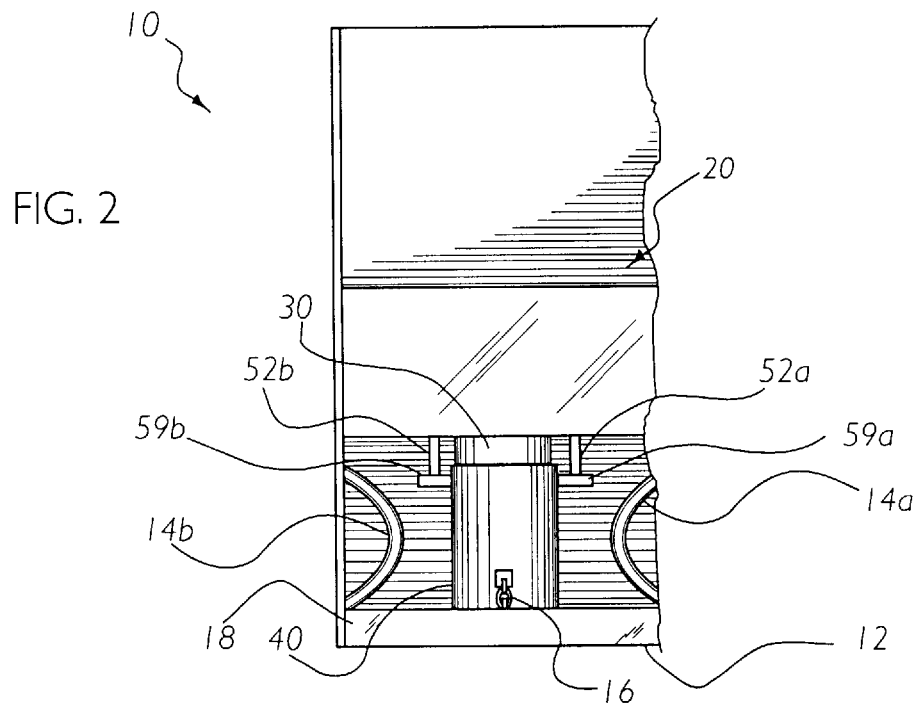

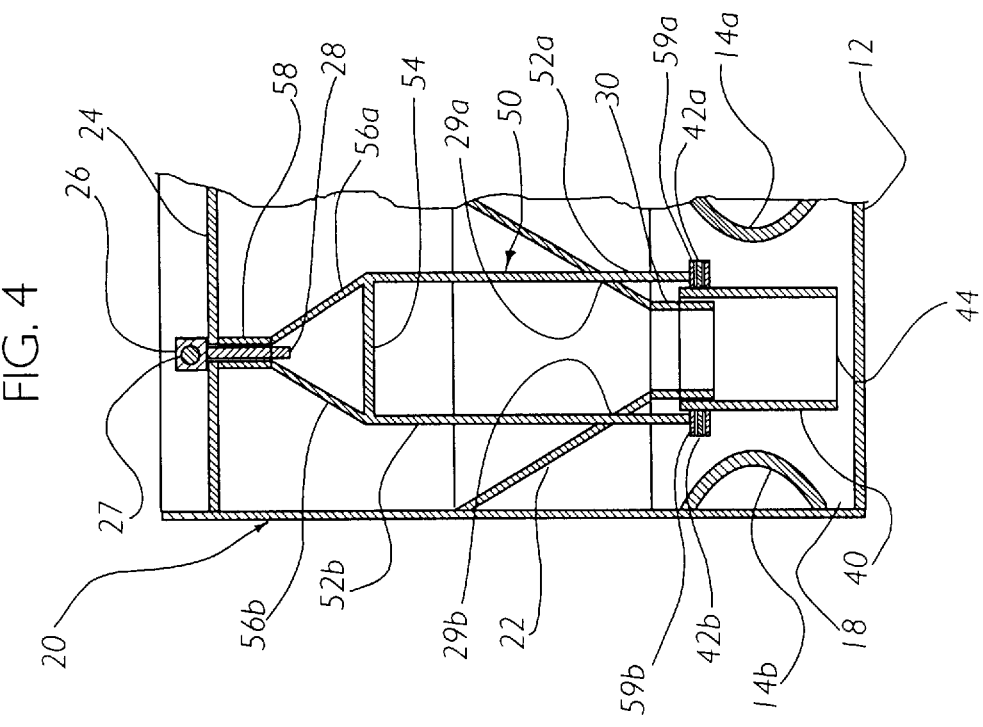
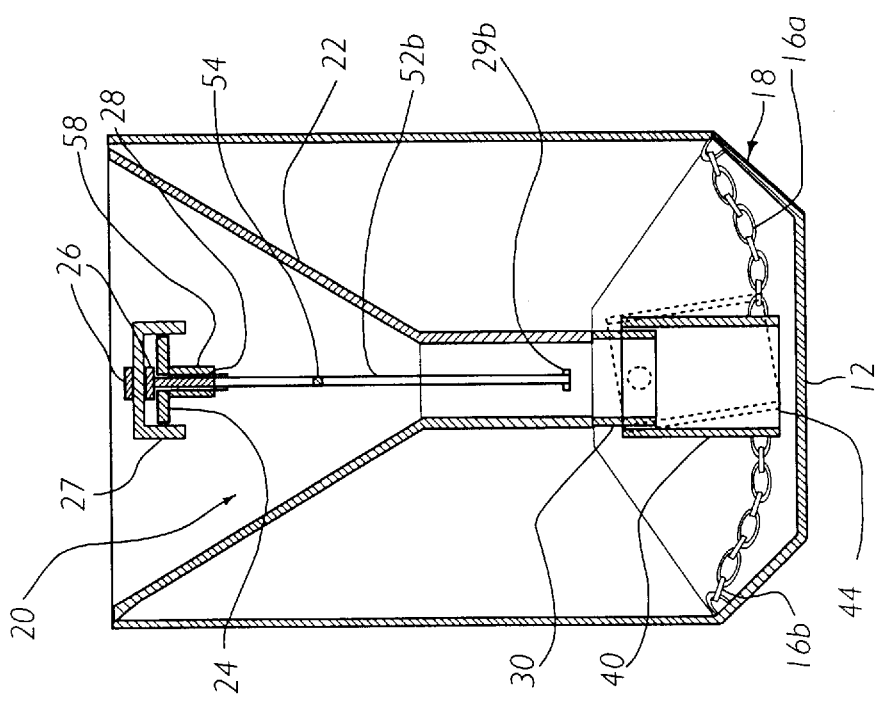

CLOG RESISTANT ANIMAL FEEDER

BACKGROUND OF THE INVENTION

1. Field of the Invention

The present invention relates generally to feed dispensing devices and more specifically it relates to a clog resistant animal feeder for providing an animal feeder, especially for pigs, which is clog resistant and which is adjustable for allowing only a specified amount of feed to be dispensed at a time.

2. Description of the Prior Art

There are numerous feed dispensing devices. For example, U.S. Pat. No. 5,146,872 to Waldner; U.S. Pat. No. 4,825,811 to O'Kelley; U.S. Pat. No. 4,242,985 to Freeborn; U.S. Pat. No. 5,558,039 to Zimmerman; U.S. Pat. No. 4,377,130 to Schwieger; U.S. Pat. No. 5,272,998 to Pannier et al; U.S. Pat. No. 1,720,884 to Clarke; U.S. Pat. No. 1,062,610 to Schisler; U.S. Pat. No. 3,812,823 to Ridder et al; U.S. Pat. No. 4,040,389 to Walters all are illustrative of such prior art.

Waldner (U.S. Pat. No. 5,146,872) discloses an animal-actuated feed-dispensing apparatus comprising a storage bin having a dispensing opening closed by a swingable gate having an engaging end. The swingable gate includes a feed charge chamber where after when an animal engages the engaging end of the swingable gate, feed within the feed charge chamber is dispensed into an animal feeding area.

O'Kelley (U.S. Pat. No. 4,825,811) discloses a pig feeding device which has an overhead feed regulation mechanism formed of a cylindrical member resting in a slot across the bottom of a feed hopper to close the slot and prevent feed from falling from the hopper. The bottom of the cylindrical member is accessible from below a slot and the pig causes feed to fall from the slot by pushing the member upward with its nose to open the slot.

Freeborn (U.S. Pat. No. 4,242,985) discloses an animal feeding device in which the animal actuates the transfer of the feed from a sheltered feed storage hopper to a feeding station by working a lever or similar device. A rotatable cylinder having pockets therein is positioned between the storage hopper and the feeding station so as to block gravity flow of the feed. A rod attached to the cylinder allows the animal to swing the rod from side to side thereby rotating the cylinder back and forth.

Zimmerman (U.S. Pat. No. 5,558,039) discloses a hog feeder with an automatic feed delivery system having a feed drop tube operatively connected thereto for dispensing feed into a feed bin.

While these devices may be suitable for the particular purpose to which they address, they are not as suitable for providing an animal feeder, especially for pigs, which is clog resistant and which is adjustable for allowing only a specified amount of feed to be dispensed at a time. Clogging of dry feed is a problem within conventional feeders. More specifically, when the dry feed becomes dampened and then dries, the feed hardens together forming large solid masses which are unable to fit through the dispensing portion. None of the prior art describes an invention which effectively allows the animal to loosen clogged feed within the dispensing portion of the feeder. The present invention allows the animal to manipulate the feeder such that the feed there within is unclogged, thereby providing a continuous automatic flow of feed into a trough portion of the feeder.

In these respects, the clog resistant animal feeder according to the present invention substantially departs from the conventional concepts and designs of the prior art, and in so doing provides an apparatus primarily developed for the purpose of providing an animal feeder, especially for pigs, which is clog resistant and which is adjustable for allowing only a specified amount of feed to be dispensed at a time.

SUMMARY OF THE INVENTION

A primary object of the present invention is to provide a clog resistant animal feeder that will overcome the shortcomings of the prior art devices.

Another object is to provide a clog resistant animal feeder that is resistant to clogging.

An additional object is to provide a clog resistant animal feeder that is adjustable in the amount of feed dispensed.

A further object is to provide a clog resistant animal feeder that is capable of being closed completely from dispensing feed.

Another object is to provide a clog resistant animal feeder that is resistant to clogging from the manual manipulation by the feeding animal.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 1 is an upper perspective view of the present invention.

FIG. 2 is a front view of the present invention.

FIG. 3 is a cross sectional view taken along line 3—3 of FIG. 1.

FIG. 4 is a cross sectional view taken along line 4—4 of FIG. 1.

DESCRIPTION OF THE PREFERRED EMBODIMENT

Turning now descriptively to the drawings, in which similar reference characters denote similar elements throughout the several view, FIGS. 1 through 4 illustrate a clog resistant animal feeder 10, which comprises a storage bin 20 having slanted side walls 22, a first tube 30 within a lower portion of the bin, and a support member 24 horizontally positioned within the bin, an elongated frame 50 adjustably attached to the support member 24 projecting downwardly through the side walls 22 about the first tube 30, and a second tube 40 pivotally attached to the elongated frame 50 about the first tube 30. A pair of chains 16a–b are preferably connected to the second tube 40 for allowing an animal to engage the chain with their nose portion for manipulating the second tube 40 where after any clogged feed within the first tube 30 is jarred loose where it is dispensed out from the second tube 40. The vertical position of the elongated frame 50 determines the amount of feed dispensed because of the distance between the second tube 40 and a floor 12 of the feeder.

As best shown in FIG. 1 of the drawings, the storage bin 20 is secured upon the trough 18. The storage bin 20 contains the feed to be dispensed. The trough 18 receives feed dispensed from within the storage bin 20 for the animals to consume. The storage bin 20 includes four side walls 22 as best shown in FIG. 1 of the drawings. The side walls 22 are substantially angled for allowing gravity to pull the feed downwardly into an aperture in a lower portion of the storage bin 20. A support member 24 projects from an interior end of the storage bin 20 to an opposite end of the storage bin 20 as best shown in FIG. 1 of the drawings. A first tube 30 is attached to the rim of the aperture as shown in FIGS. 3 and 4.

As best shown in FIGS. 1, 3 and 4 of the drawings, a T-member 26 having a threaded portion 28 rotatably projects downwardly through the support member 24 substantially concentric to the first tube 30. A third tube 58 having a threaded lumen is threadably engaged to the threaded portion 28 of the T-member 26 opposite of the support member 24. A handle member 27 is pivotally attached to the T-member 26 opposite of the threaded portion 28 for allowing the user to rotate the T-member 26. The handle member 27 further allows the user to lock the T-member 26 with respect to the support member 24. The T-member 26 in threadable cooperation with the third tube 58 provide a means whereby the user is able to adjust the elevation of the elongated frame 50. The support member 24 and the T-member 26 are preferably positioned near an upper portion of the storage bin 20 for allowing easy manipulation of the T-member 26 from an opening within the upper portion of the storage bin 20.

The elongated frame 50 includes a pair of angled members 56a–b having an upper end and a lower end. The upper end of the angled members 56a–b is secured to the third tube 58. A corresponding pair of side members 52a–b are attached to the lower end of the pair of angled members 56a–b as best shown in FIG. 4. A cross member 54 extends between the pair of side members 52a–b adjacent the angled members 56a–b for increasing support. The pair of side members 52a–b are parallel to one another and slidably project through a corresponding pair of apertures 29a–b in the storage bin 20. The pair of side members 52a–b project substantially parallel to and about the first tube 30 as shown in FIG. 2 of the drawings. A pair of fourth tubes 59a–b are secured orthogonally to the ends of the pair of side members 52a–b opposite of the angled members 56a–b.

As shown in FIG. 2 of the drawings, the second tube 40 movably surrounds the first tube 30. The diameter of the second tube 40 is larger than the first tube 30 for allowing the second tube 40 to be movable about the first tube 30. The second tube 40 includes a pair of axle members 42a–b rotatably positioned within the pair of fourth tubes 59a–b for allowing the second tube 40 to movably engage the first tube 30 for preventing clogging of dry feed with the storage bin 20. The second tube 40 has a bottom perimeter 44 which is engageable to a floor 12 of the trough 18 for closing the flow of feed into the trough 18. The elevation of the second tube 40 is adjusted by rotating the T-member 26 for elevating the elongated frame 50 which supports the second tube 40.

As shown in FIG. 1, a pair of stopping members 14a–b are secured to side portions of the trough 18 adjacent the second tube 40 for preventing the animal from getting their head positioned to the side of the second tube 40. A pair of chains 16a–b are attached to opposing exterior sides of the second tube 40 adjacent the bottom perimeter 44. The animal engages the pair of chains 16a–b with their nose thereby manipulating the second tube 40 to pivot about the fourth tubes 59a–b. The pivoting of the second tube 40 engages the first tube 30 thereby loosening any hardened feed within the storage bin 20 and the first tube 30.

In use, the storage bin 20 is filled with feed. The feed flows down into the first tube 30 and the second tube 40 and thereafter into the trough 18. The animal consumes the feed within the trough 18 and more feed automatically is dispensed by gravity from the second tube 40. The amount of feed present within the trough 18 is determined by the distance between the bottom perimeter 44 of the second tube 40 and the floor 12 of the trough 18. The further the distance, the more feed that is present within the trough 18. When the feed becomes hardened or clogged within the storage bin 20, the first tube 30 or the second tube 40, the animal merely engages one of the chains 16a–b forcing the second tube 40 to pivot. The pivoting action of the second tube 40 causes the second tube 40 to engage the first tube 30 thereby vibrating the first tube 30 and the storage bin 20. The vibration loosens the hardened or clogged feed thereby allowing the flow of feed into the trough 18 to continue uninterrupted. When the user desires to stop the flow of feed into the trough 18, the T-member 26 is rotated so as to allow the elongated frame 50 to descend. The elongated frame 50 descends until the bottom perimeter 44 of the second tube 40 engages the floor 12 of the trough 18 thereby terminating the flow of feed into the trough 18.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A clog resistant animal feeder which is resistant to clogging, comprising:

a trough having a front portion and a rear portion;

a storage bin attached to said trough;

wherein said storage bin includes at least one interior side wall and a lower portion for storing feed within;

wherein said lower portion includes an aperture;

a dispensing means attached to said lower portion of said storage bin about said aperture which is movable for preventing clogging of said feed within said storage bin and said dispensing means; and wherein said dispensing means comprises:

a height adjusting means attached within said storage bin;

an elongated frame having a lower end and an upper end, wherein said upper end is attached to said height adjusting means and said lower end projects through said storage bin;

a first tube secured to said lower portion of said storage bin about said aperture for receiving said feed from within said storage bin; and a second tube having a bottom perimeter movably attached to said lower end of said elongated frame for engaging said first tube for loosening clogged feed within said first tube or said storage bin.

2. The clog resistant animal feeder of claim 1, including at least one chain attached to either said front portion or said rear portion of said trough at one end thereof and attached to said second tube opposite of said portion for allowing an animal to manipulate said chain thereby manipulating said second tube.

3. The clog resistant animal feeder of claim 2, wherein said height adjusting means comprises:

a T-member having a longitudinal portion and a traverse portion, wherein said longitudinal portion is threaded and rotatably projects through a support member of said storage bin;

a third tube having a threaded lumen, wherein said upper end of said elongated frame is attached to said third tube; and said threaded lumen of said third tube is threadably engaging said threaded longitudinal portion of said T-member.

4. The clog resistant animal feeder of claim 3, wherein said height adjusting means further includes a handle member pivotally attached to said traverse portion of said T-member for allowing a user to manually manipulate said T-member and for locking said T-member to said support member.

5. The clog resistant animal feeder of claim 4, wherein said elongated frame comprises:

a pair of angled members attached to said third tube and projecting away from one another; and a corresponding pair of side members attached to said pair of angled members opposite of said third tube and projecting downwardly through a corresponding pair of apertures within said storage bin and movably engaging said second tube.

6. A clog resistant animal feeder which is resistant to clogging, comprising:

a trough having a front portion and a rear portion;

a storage bin attached to said trough;

wherein said storage bin includes at least one interior side wall and a lower portion for storing feed within;

wherein said lower portion includes an aperture;

a dispensing means attached to said lower portion of said storage bin about said aperture which is movable for preventing clogging of said feed within said storage bin and said dispensing means; and wherein said dispensing means comprises:

an elongated frame having a lower end and an upper end, wherein said upper end is attached to said storage bin and said lower end projects through said storage bin;

a first tube secured to said lower portion of said storage bin about said aperture for receiving said feed from within said storage bin; and a second tube having a bottom perimeter movably attached to said lower end of said elongated frame for engaging said first tube for loosening clogged feed within said first tube or said storage bin.

* * * * *